Patented Nov. 21, 1933

1,936,115

UNITED STATES PATENT OFFICE

1,936,115

PROCESS OF VULCANIZING RUBBER AND PRODUCT OBTAINED THEREBY

Clayton Olin North, Nitro, W. Va., assignor to The Rubber Service Laboratories Company, Akron, Ohio, a corporation of Ohio No Drawing. Application February 17, 1930
Serial No. 429,217

2 Claims. (Cl. 18—53)

The present invention relates to the vulcanization of rubber by a new and improved process whereby a vulcanized rubber product is obtained which possesses desirable and valuable physical characteristics. The invention relates more particularly to the production of a rubber product of high tensile strength and age resisting characteristics by vulcanizing a rubber mix in the presence of a reaction product of the type hereinafter set forth.

More specifically, the invention relates to the vulcanization of rubber wherein a reaction product of a diphenyl amine and particularly of 2,4 diamino-diphenyl amine with a mercaptobenzothiazole is incorporated in a rubber stock of vulcanization characteristics prior to the vulcanization thereof.

It is well known that mercaptobenzothiazole possesses the properties of accelerating the rubber vulcanization process. According to the present invention, as hereinafter set forth, the accelerating properties of mercaptobenzothiazole are materially increased by reacting with a diphenyl amine and particularly with 2,4 diamino-diphenyl amine. One method whereby the preferred accelerating compound was prepared is as follows. Substantially 3 molecular proportions of mercaptobenzothiazole and substantially 1 molecular proportion of 2,4 diamino-diphenyl amine were heated in the presence of a suitable organic solvent, for example ethyl alcohol, at a temperature between approximately 35 to 65° C. until reaction was completed. On completion of the reaction, any undissolved material was filtered off and the desired reaction product contained in the alcoholic filtrate was precipitated preferably by adding the filtrate slowly to water maintained at approximately 0 to 10° C., whereupon the desired material was obtained as a gray colored crystalline product. After washing this material with water to remove any occluded organic solvent, the resulting product when dried melted at from 142.5 to 147° C.

A method of employing the preferred accelerating material is illustrated by the following example wherein a rubber tread stock was compounded in the usual manner. This stock comprised 50 parts pale crepe rubber
50 parts smoked sheet rubber
10 parts zinc oxide
40 parts carbon black
2 parts stearic acid
1.5 parts of a blended mineral oil and rosin
3 parts sulfur
0.75 part of the reaction product of mercaptobenzothiazole and 2,4 diamino-diphenyl amine.

The compounded rubber stock was then vulcanized by heating in a press for different periods of time at the temperatures given by the steam pressures indicated in the table below. The rubber stock thus cured, on testing, was found to possess the following physical characteristics.

*Table I*

| Cure | | Modulus of elasticity in lbs/in² at elongations of— | | Tensile at break in lbs/in² | Ultimate elongation, % |
|---|---|---|---|---|---|
| Time, minutes | Lbs. steam pressure | 300% | 500% | | |
| 60 | 10 | 398 | 1250 | 2330 | 690 |
| 90 | 10 | 773 | 1960 | 3130 | 660 |
| 45 | 20 | 880 | 2225 | 3525 | 600 |
| 60 | 20 | 1065 | 2665 | 3730 | 635 |
| 90 | 20 | 1255 | 3030 | 4160 | 615 |
| 120 | 20 | 1343 | 3195 | 4600 | 650 |
| 180 | 20 | 1598 | 3525 | 4700 | 625 |

A stock identical with that hereinabove set forth except that 1 part of mercaptobenzothiazole was incorporated therein as the accelerator in place of the material set forth in the example, on curing and testing was found to possess the following physical characteristics.

*Table II*

| Cure | | Modulus of elasticity in lbs/in² at elongations of— | | Tensile at break in lbs/in² | Ultimate elongation, % |
|---|---|---|---|---|---|
| Time, minutes | Lbs. steam pressure | 300% | 500% | | |
| 60 | 10 | 371 | 1065 | 1900 | 690 |
| 90 | 10 | 770 | 1775 | 2840 | 675 |
| 45 | 20 | 809 | 1910 | 2960 | 650 |
| 60 | 20 | 1080 | 2415 | 3300 | 610 |
| 90 | 20 | 1230 | 2785 | 3880 | 615 |
| 120 | 20 | 1200 | 2860 | 3815 | 605 |
| 180 | 20 | 1515 | 3275 | 3990 | 585 |

Upon comparing the tensile data of the two stocks set forth in the above tables, it is apparent that the preferred accelerating compound disclosed in the present application is superior as an accelerator to mercaptobenzothiazole itself. This conclusion is evident from the test results set forth, wherein applicant's preferred accelerating material produces higher tensile values than does one-third more by weight of mercaptobenzothiazole.

The reaction product of mercaptobenzothiazole and 2,4 diamino-diphenyl amine was also incorporated as an accelerator in a characteristic carcass stock comprising 100 parts pale crepe rubber
8 parts zinc oxide
2 parts stearic acid
3 parts sulfur
0.5 parts of the accelerator set forth.

The rubber stock so formed was vulcanized by heating in a press in the usual manner for different periods of time and at the temperatures given by the different steam pressures indicated in the table. The physical characteristics obtained by testing the foregoing rubber stock are as follows:

Table III

| Cure | | Modulus of elasticity in lbs/in$^2$ at elongations of— | | | Tensile at break in lbs/in$^2$ | Ultimate elongation, % |
|---|---|---|---|---|---|---|
| Time, minutes | Lbs. steam pressure | 300% | 500% | 700% | | |
| 60 | 10 | 149 | 443 | 1748 | 3050 | 815 |
| 90 | 10 | 223 | 651 | 2523 | 3800 | 780 |
| 45 | 20 | 223 | 599 | 2330 | 3960 | 805 |
| 60 | 20 | 265 | 741 | 2850 | 4045 | 775 |
| 90 | 20 | 266 | 900 | 3320 | 4170 | 740 |
| 120 | 20 | 320 | 945 | 3620 | 4305 | 730 |

Another example similar to the foregoing except that a lesser proportion of accelerator was employed in the carcass stock, is the following wherein a rubber mix was prepared comprising 100 parts pale crepe rubber
8 parts zinc oxide
2 parts stearic acid
3 parts sulfur
0.375 parts of the reaction product of mercaptobenzothiazole and 2,4 diamino-diphenyl amine.

The rubber stock was then cured and tested and the physical characteristics set forth in the following table were obtained.

Table IV

| Cure | | Modulus of elasticity in lbs/in$^2$ at elongations of— | | | Tensile at break in lbs/in$^2$ | Ultimate elongation, % |
|---|---|---|---|---|---|---|
| Time, minutes | Lbs. steam pressure | 300% | 500% | 700% | | |
| 45 | 10 | 55 | 154 | 638 | 1133 | 810 |
| 60 | 10 | 112 | 307 | 1178 | 2840 | 880 |
| 90 | 10 | 161 | 446 | 1728 | 3110 | 820 |
| 45 | 20 | 171 | 433 | 1683 | 3265 | 830 |
| 60 | 20 | 202 | 571 | 2248 | 3795 | 795 |
| 90 | 20 | 212 | 680 | 2718 | 3585 | 760 |
| 120 | 20 | 245 | 765 | 3165 | 4000 | 745 |
| 180 | 20 | 311 | 845 | 3435 | 3660 | 735 |

The foregoing tests with a carcass stock prove the activity of the preferred accelerator. Even those cures made in short periods of time at the lower steam pressures show rapid acceleration of the cure, while the cures produced over a longer heating period develop a rubber of high quality and do not show a tendency to overcure badly as is usually experienced with the so called ultra and semi-ultra accelerators.

As a further example of the application of the preferred accelerator in rubber compounding, a so called pure gum stock was prepared in the well known manner comprising 100 parts pale crepe rubber
5 parts zinc oxide
3.5 parts sulfur
0.75 parts of the accelerator described, that is the reaction of 3 molar proportions of mercaptobenzothiazole and 1 molar proportion of 2,4 diamino-diphenyl amine.

The stock was then vulcanized by heating test portions of the mix for varying periods of time as indicated in the following table and the physical characteristics therein set forth were obtained.

Table V

| Cure | | Modulus of elasticity in lbs/in$^2$ at elongations of— | | | Tensile at break in lbs/in$^2$ | Ultimate elongation, % |
|---|---|---|---|---|---|---|
| Time, minutes | Lbs. steam pressure | 300% | 500% | 700% | | |
| 30 | 10 | 158 | 350 | 1213 | 2590 | 840 |
| 60 | 10 | 205 | 510 | 1990 | 3150 | 785 |
| 30 | 20 | 211 | 598 | 2270 | 3010 | 750 |
| 60 | 20 | 288 | 828 | 2705 | 3390 | 750 |
| 15 | 40 | 258 | 654 | 2240 | 3060 | 770 |
| 30 | 40 | 285 | 671 | 2280 | 3395 | 750 |
| 45 | 40 | 223 | 597 | 2250 | 2705 | 770 |
| 60 | 40 | 243 | 554 | 2025 | 3190 | 780 |

The above results clearly demonstrate the accelerating power of the preferred accelerator. Very appreciable vulcanization is produced in the stock at the lower temperatures employed while excellent results are obtained by curing for 30 minutes at 287° F. (the temperature given by 40 lbs. steam pressure).

It is apparent from the foregoing examples set forth that a reaction product of a mercaptobenzothiazole and of a diamino-diphenyl amine comprises an important accelerator of the vulcanization process. It has furthermore been found that a rubber product vulcanized in the presence of the reaction product of mercaptobenzothiazole and 2,4 diamino-diphenyl amine, when subjected to an accelerated ageing test by exposing test pieces of the vulcanized rubber for 27 hours in a bomb maintained under a pressure of 300 lbs. of oxygen to the square inch and at a temperature of 70° C., retained the desirable properties of the rubber to a remarkable degree.

The present invention is limited solely by the following claims attached hereto as a part of this specification.

What is claimed is:

1. A process of vulcanizing rubber which comprises heating rubber and sulfur in the presence of a reaction product of substantially 3 molecular proportions of mercaptobenzothiazole and substantially 1 molecular proportion of 2,4 diamino-diphenyl amine.

2. The vulcanized rubber product obtained by heating rubber and sulfur in the presence of a reaction product of substantially 3 molecular proportions of mercaptobenzothiazole and substantially 1 molecular proportion of 2,4 diamino-diphenyl amine.

CLAYTON OLIN NORTH.